(12) United States Patent
Ukita et al.

(10) Patent No.: US 6,785,192 B2
(45) Date of Patent: Aug. 31, 2004

(54) REPRODUCTION APPARATUS AND REPRODUCTION METHOD

(75) Inventors: Yoshitaka Ukita, Tokyo (JP); Kenji Irie, Kanagawa (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 09/919,272

(22) Filed: Jul. 31, 2001

(65) Prior Publication Data

US 2002/0064096 A1 May 30, 2002

(30) Foreign Application Priority Data

Aug. 3, 2000 (JP) ..................................... P2000-235166
Jul. 9, 2001 (JP) ..................................... P2001-207659

(51) Int. Cl.7 ........................... G04B 47/00; G04C 1/00; G01R 31/00
(52) U.S. Cl. ....................... 368/10; 368/64; 365/185.11; 703/63
(58) Field of Search .............................. 368/10, 46, 47, 368/64, 66, 204; 365/185.11, 185.33, 185.12; 702/63; 713/340

(56) References Cited

U.S. PATENT DOCUMENTS

| | | | | |
|---|---|---|---|---|
| 4,150,333 A | * | 4/1979 | Edwards | ...................... 368/118 |
| 4,634,288 A | * | 1/1987 | Lobato | ........................ 368/200 |
| 5,406,272 A | * | 4/1995 | Jang | .......................... 340/7.37 |
| 5,596,512 A | * | 1/1997 | Wong et al. | .................. 702/63 |
| 5,805,530 A | * | 9/1998 | Youngberg | .................... 368/47 |
| 6,262,915 B1 | * | 7/2001 | Kihara et al. | .......... 365/185.11 |

\* cited by examiner

Primary Examiner—Vit W. Miska
(74) Attorney, Agent, or Firm—Jay H. Maioli

(57) ABSTRACT

A reproduction apparatus and a reproduction method by which an error of time information that arises from interruption of power supplied to a timer that manages the term of term-managed contents data is minimized to allow accurate term management of the contents data. The timer produces time information when power is supplied to the timer from a cell, but the timer stops operating when no power is supplied thereto. The time information produced by the timer is stored into a memory, and the memory holds the stored time information when no power is supplied to the timer. When power from the cell is restored to the timer, the timer is set accordingly to the time information stored in the memory, so that the timer may thereafter produce correct time information thereby allowing term management of the term-managed contents data to be performed accurately.

14 Claims, 11 Drawing Sheets

F I G. 3
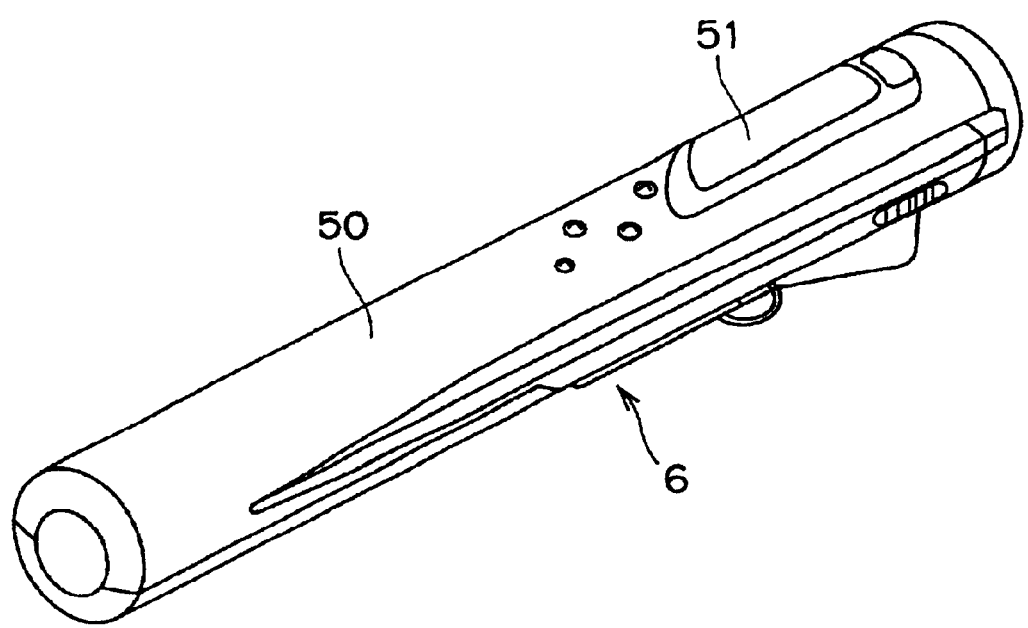

REPRODUCTION APPARATUS AND REPRODUCTION METHOD

BACKGROUND OF THE INVENTION

This invention relates to a reproduction apparatus and a reproduction method wherein a term of term-managed contents data is managed by a timer.

In recent years, such a service as to allow an information processing apparatus such as a personal computer to access an electrical music distribution (EMD) server through a predetermined network to receive contents such as music data from the EMD server so that the user of the information processing apparatus may enjoy the contents has been and is being popularized. Among contents distributed in this manner, some contents are distributed free of charge on condition that enjoyment of the contents is permitted only within a predetermined limited period, for example, for advertisement.

An apparatus which handles contents whose term for enjoyment is limited as described above must include a clock function in order to manage the term. Further, power supply is temporarily interrupted upon exchange of a battery or the like, and in order to prepare for such temporary power supply interruption, also it is necessary for an apparatus of the type described to include a power supply backup function.

However, in order to provide a power supply backup function, different power supply wiring line systems must be designed for circuit blocks for which power supply backup is required and circuit blocks for which power supply backup is not required. Therefore, the apparatus of the type described above has a subject to be solved in that it is complicated in circuit configuration and miniaturization of the circuit is difficult.

Further, where an exchangeable primary cell is used as the backup power supply for the power supply, such a trouble may possibly occur that time information is lost because the time within which the power supply can be backed up elapses during an exchanging operation process of the primary cell.

SUMMARY OF THE INVENTION

It is an object of the present invention to provide a reproduction apparatus and a reproduction method by which the error of time information which arises from interruption of power supply to a timer which manages a term of term-managed contents data is minimized to allow accurate term management.

In order to attain the object described above, according to an aspect of the present invention, there is provided a reproduction apparatus which operates with a battery for reproducing term-managed main data, comprising main data storage means for storing the term-managed main data, term data storage means for storing term management data to be used for the term-management of the main data, time counting means operating with the battery for counting time, holding means for holding time information counted by the time counting means also when power is not supplied thereto from the battery, and control means for controlling the holding means to hold the time information counted by the time counting means at a predetermined time According to another aspect of the present invention, there is provided a reproduction apparatus which operates with a battery for reproducing main data term-managed based on term management information, comprising time counting means operable only while power is supplied thereto from the battery for counting time to be used for the term management, holding means for holding the time counted by the time counting means while power from the battery is not supplied to the time counting means, and control means for controlling reproduction of the main data based on the term management information and the time information counted by the time counting means.

According to a further aspect of the present invention, there is provided a reproduction method for a reproduction apparatus which reproduces term-managed main data using a battery as a power supply, comprising the steps of reading, from a timer which operates with the power supply from the battery to count time and stops the time counting when the power is not supplied from the battery, time information to be used for the term management of the main data and writing the time information into a nonvolatile memory which holds data even when the power is not supplied thereto from the battery, and setting the time information written in the nonvolatile memory to the timer when the power is supplied again after the power supply from the battery is interrupted.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a perspective view showing an appearance of a portable device shown in FIG. 1;

DESCRIPTION OF THE PREFERRED EMBODIMENT

Figure 1:
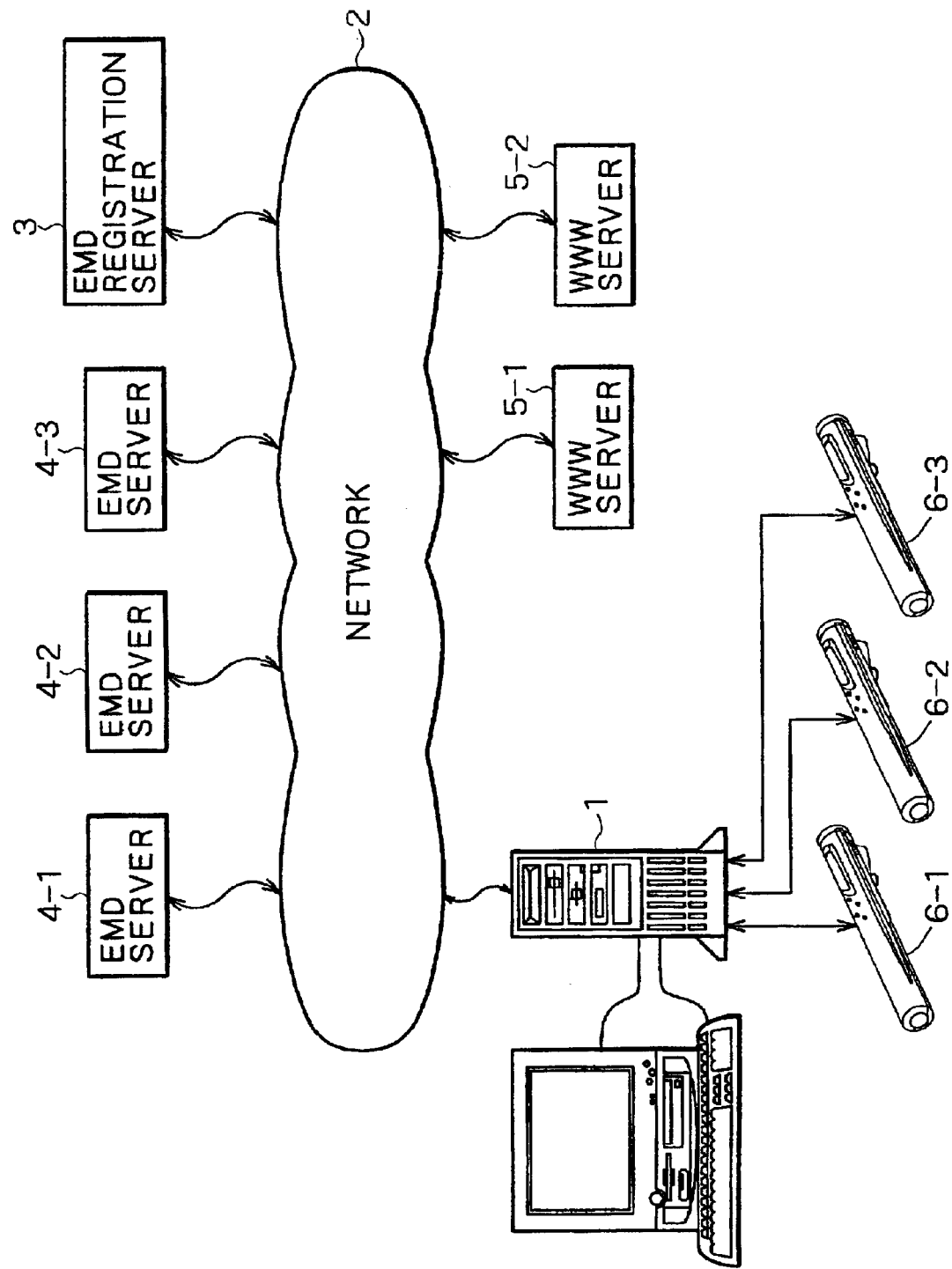
FIG. 1 is a diagrammatic view showing a configuration of an information processing system to which the present invention is applied.

Referring first to FIG. 1, there is shown an information processing system in the form of an audio data management system to which the present invention is applied. In the audio data management system shown, a personal computer 1 is connected to a network 2 which may be a local area network, the Internet or the like. The personal computer 1 converts audio data, that is, contents, received from an EMD server 4-1, 4-2 or 4-3 or read from a CD (Compact Disk), which is hereinafter described, into data compressed in accordance with a predetermined compression system such as, for example, the ATRAC (Advanced TRansform Acoustic Coding) 3 (trademark), encrypts the compressed data in accordance with an encryption system such as the DES (Data Encryption Standard) and records the encrypted compressed data. It is to be noted that, in the following description, where there is no necessity to distinct the EMD servers 4-1, 4-2 and 4-3 individually from one another, each of them is referred to merely as EMD server 4. This similarly applies also to other similar elements.

The personal computer 1 records utilization condition data representative of utilization conditions of recorded encrypted contents in a corresponding relationship to the contents. The utilization condition data represent that the contents corresponding thereto can be utilized by three portable devices 6-1, 6-2 and 6-3 simultaneously, can be copied or can be moved to the other personal computer or computers.

The personal computer 1 stores the recorded encrypted contents into a portable device 6 connected thereto and updates, in response to such storage into the portable device 6, the utilization condition data corresponding to the stored contents. This operation of the personal computer 1 is hereinafter referred to as check-out. Further, the personal computer 1 erases contents stored in a portable device 6 connected thereto from the portable device 6 and updates the utilization condition data corresponding to the erased contents. This operation of the personal computer 1 is hereinafter referred to as check-in.

An EMD registration server 3 transmits, in response to a request of the personal computer 1 when the personal computer 1 starts acquisition of contents from an EMD server 4, an authentication key necessary for mutual authentication between the personal computer 1 and the EMD server 4 to the personal computer 1, and transmits, if necessary, a program for connection to the EMD server 4 to the personal computer 1, through the network 2.

Each EMD server 4 supplies, in response to a request of the personal computer 1, contents to the personal computer 1 by transmission through the network 2. Contents supplied from the EMD servers 4-1, 4-2 and 4-3 are data compressed in accordance with the same compression system or different compression systems. Further, contents supplied from the EMD servers 4-1, 4-2 and 4-3 are data encrypted in accordance with the same encryption system or different encryption systems.

If a CD is set in position into a CD player connected to the personal computer 1, then the personal computer 1 can acquire an attribute of the set CD or an attribute of contents recorded on the CD from a WWW (World Wide Web) server 5-1 or 5-2 connected thereto through the network 2.

In particular, each of the WWW servers 5-1 and 5-2 supplies, for example, the name of an album or a distributor of a CD from which contents are read and the title or the name of the composer of a musical composition of data corresponding to the contents read from the CD to the personal computer 1 through the network 2 in response to a request of the personal computer 1.

Each portable device 6 stores contents supplied thereto from the personal computer 1, that is, checked out contents, into a memory or the like provided therein. The portable device 6 reproduces the stored contents and outputs the reproduced contents to a headphone not shown or the like.

The user can remove the portable device 6, in which contents are stored, from the personal computer 1, carry the portable device 6, reproduce the stored contents from the portable device 6 and enjoy music or the like corresponding to the contents by means of the headphone or the like.

Figure 2:
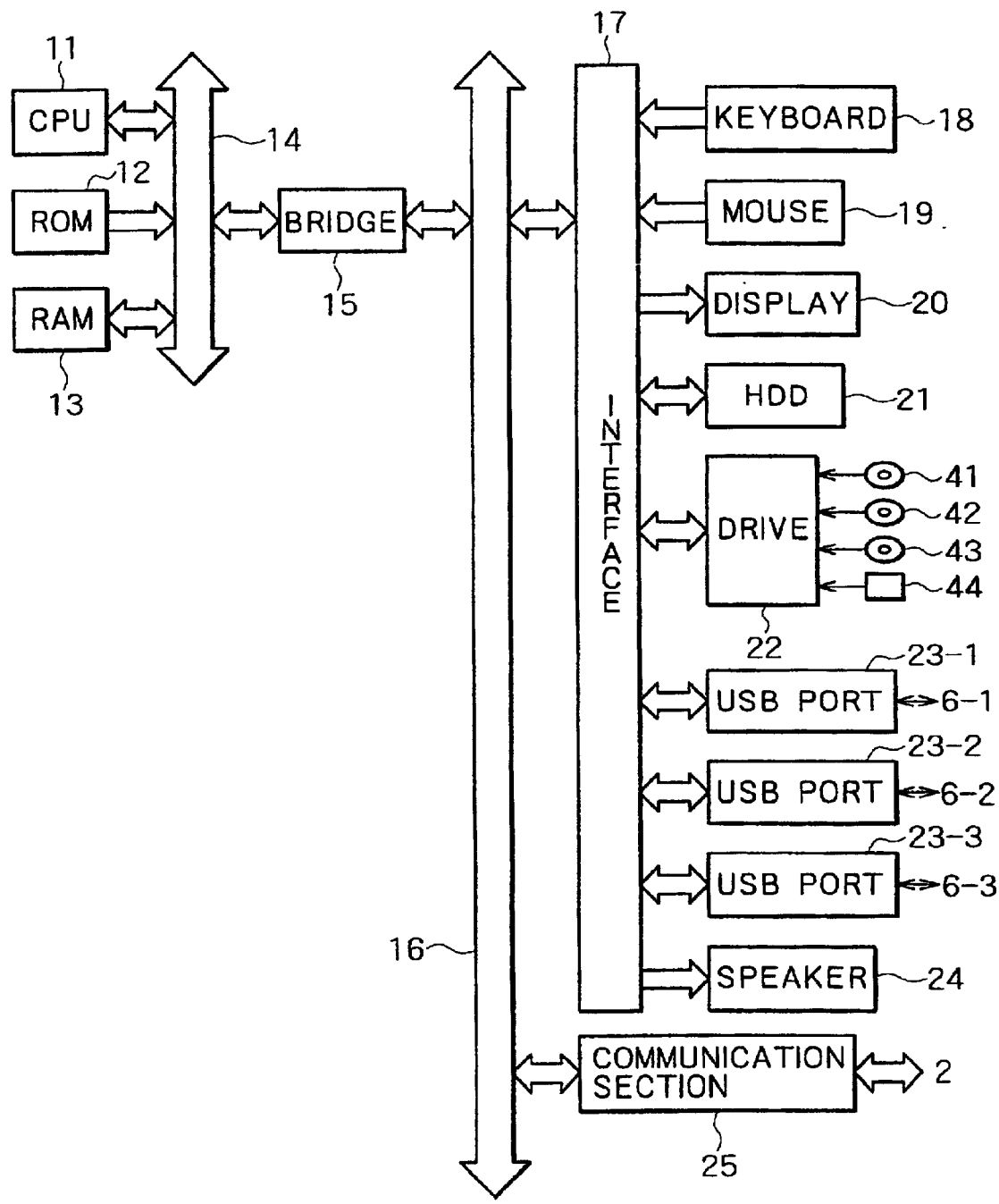
FIG. 2 is a block diagram showing an internal configuration of a personal computer shown in FIG. 1.

FIG. 2 shows a configuration of the personal computer 1. Referring to FIG. 2, a central processing unit (CPU) 11 actually executes various application programs and an operating system (OS). A read-only memory (ROM) 12 generally stores programs to be used by the CPU 11 and basically fixed data from among parameters for use for arithmetic operation. A random-access memory (RAM) 13 stores programs to be used in execution of the CPU 11 and parameters which vary suitably during execution of such programs. The CPU 11, ROM 12 and RAM 13 are connected to one another by a host bus 14 which may be a CPU bus or the like.

The host bus 14 is connected through a bridge 15 to an external bus 16 such as a PCI (Peripheral Component Interconnect/Interface) bus.

A keyboard 18 is operated by the user in order to input various instructions to the CPU 11. A mouse 19 is operated by the user in order to designate or select a point on a screen of a display unit 20. The display unit 20 may be a liquid crystal display apparatus or a CRT (Cathode Ray Tube) and displays various kinds of information in the form of a text or an image. A hard disk drive (HDD) 21 drives a hard disk not shown to record or reproduce a program to be executed by the CPU 11 or information onto or from the hard disk.

A drive 22 reads out data or a program recorded on a magnetic disk 41, an optical disk 42 including a CD, a magneto-optical disk 43 or a semiconductor memory 44, which is loaded therein, and supplies the data or program to the RAM 13 connected thereto through an interface 17, the external bus 16, the bridge 15 and the host bus 14.

The portable devices 6-1, 6-2 and 6-3 are connected to universal serial bus (USB) ports 23-1, 23-2 and 23-3 by predetermined cables, respectively. Each USB port 23 outputs data supplied thereto from the HDD 21, CPU 11 or RAM 13 through the interface 17, external bus 16, bridge 15 and host bus 14 to a portable device 6 connected thereto. In this instance, the data outputted to the portable device 6 include, for example, contents, a command of the portable device 6 or the like.

A speaker 24 outputs predetermined sound corresponding to contents based on data or an audio signal supplied thereto from the interface 17.

The keyboard 18, mouse 19, display unit 20, HDD 21, drive 22, USB ports 23-1, 23-2 and 23-3, and speaker 24 are connected to the interface 17, which is in turn connected to the CPU 11 through the external bus 16, bridge 15 and host bus 14.

A communication section 25 is connected to the CPU 11 through the external bus 16, bridge 15 and host bus 14.

The communication section 25 is connected also to the network 2, and places data of a request for registration or a request for transmission of contents supplied thereto from the CPU 11 or the HDD 21 into a packet of a predetermined system and transmits the packet through the network 2. Further, the communication section 25 outputs, for example, an authentication key or data of contents or the like placed in a packet received through the network 2 to the CPU 11, RAM 13 or HDD 21.

Now, the portable device 6 is described. FIG. 3 shows an appearance of the portable device 6. Referring to FIG. 3, the portable device 6 includes a casing 50 of a substantially cylindrical profile. The casing 50 has various operation switches and operation buttons, a display window 51 for a display section and so forth provided on a circumferential face thereof.

Different circumferential face portions of the portable device 6 when the casing 50 is rotated successively by 45 degrees around an axis thereof where the circumferential face portion on which the display window 51 is provided is defined as the front face are described with reference to FIGS. 4A, 4B, 4C and 4D.

Figure 4A:
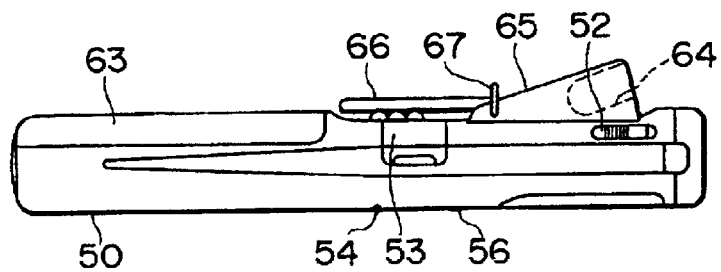
FIGS. 4A to 4E are schematic views of the portable device of FIG. 3 as viewed in different directions.

As seen from FIG. 4A, a sound volume upper limit fixation switch 52 for fixing an upper limit to the sound volume to one end side of the casing 50 in its longitudinal direction is provided for sliding movement on a left side face of the casing 50. A USB connector cover 53 made of a plastic material is provided on the left side face of the casing 50 such that it opens or closes up a hole not shown in which a USB (Universal Serial Bus) connector is accommodated.

The USB connector cover 53 actually closes up, when the USB connector is not used, the hole in such a manner that it is integrated with the casing 50 to protect the USB connector. On the other hand, when the USB connector is to be used, the USB connector cover 53 can open the hole so that the USB connector can be connected to the personal computer 1 by a USB cable 91 hereinafter described with reference to FIG. 5.

Figure 4B:
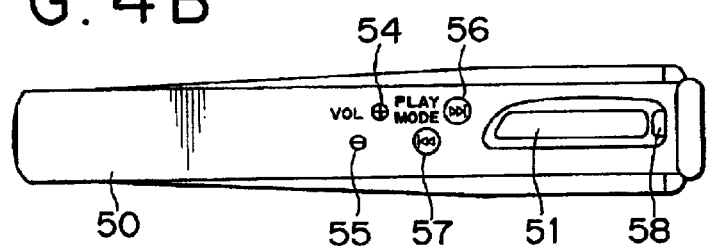
Figure 4E:
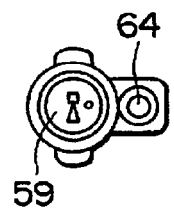

Meanwhile, as shown in FIG. 4B, at a portion from a substantially mid portion to one end of the front face of the casing 50, a sound volume up button 54, a sound volume down button 55, a fast feed button 56, a fast return button 57, the display window 51 and a shift button 58 are provided in order. Further, a reproduction/stop button 59 which can input a reproduction instruction and a stop instruction is provided on one end face of the casing 50 which is shown in FIG. 4E.

On the front face of the casing 50, a display section 85 shown in FIG. 5 which is provided below the display window 51 performs display in response to various operations, and the displayed contents of the display section 85 can be presented through the display window 51.

The shift button 58 functions, if the fast feed button 56 is depressed while it is kept depressed, as an operation button for changing over the reproduction mode together with the fast feed button 56. Further, the shift button 58 functions, if the fast return button 57 is depressed while it is kept depressed, as an operation button for changing over the sound volume mode together with the fast return button 57.

Figure 4C:
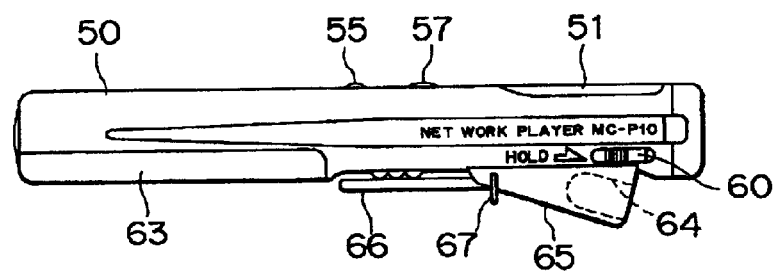

Further, as shown in FIG. 4C, a hold switch 60 is provided for sliding movement on one end side of the right side face of the casing 50 such that, for example, if it is slidably moved to the one end side of the casing 50, then inputting of various operation buttons is invalidated, and this state can be maintained.

Figure 4D:
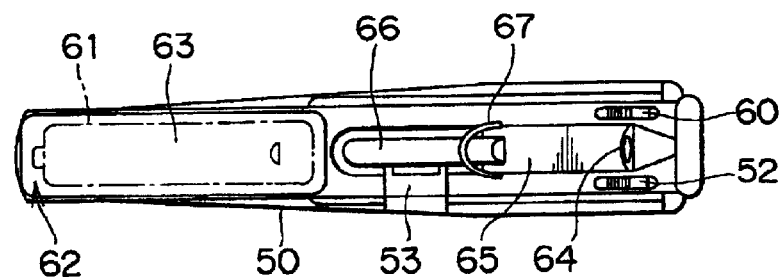

In addition, as shown in FIG. 4D, a dry cell accommodation section 62 into which a driving dry cell 61 of the AA size can be loaded is provided on one end side of the rear face of the casing 50, and a lid member 63 for closing up the dry cell accommodation section 62 is removably mounted on the rear face of the casing 50. Consequently, if the lid member 63 is removed, then the driving dry cell 61 can be loaded into the dry cell accommodation section 62 and can be unloaded from the dry cell accommodation section 62. Further, if the lid member 63 is mounted while the driving dry cell 61 is loaded in the dry cell accommodation section 62, then the lid member 63 prevents the driving dry cell 61 from coming out of the dry cell accommodation section 62.

Further, a jack holding portion 65 for holding a headphone jack 64 and a clip member 66 for attaching the casing 50 to a breast pocket or the like of an outerwear of a user are provided in a juxtaposed relationship in a longitudinal direction of the casing 50 on one end side of the rear face of the casing 50. Further, an annular strap metal member 67 is provided at a predetermined position of the rear face of the casing 50 adjacent the jack holding portion 65 and the clip member 66 and displaced from the center of gravity of the portable device 6.

The strap metal member 67 is mounted for pivotal motion within a range of approximately 180 degrees between a position in which it contacts with the jack holding portion 65 and another position in which it contacts with the clip member 66 with respect to the back face of the casing 50. If the strap metal member 67 is pivoted uprightly, then various kinds of straps can be attached to and removed from the strap metal member 67.

Figure 5:
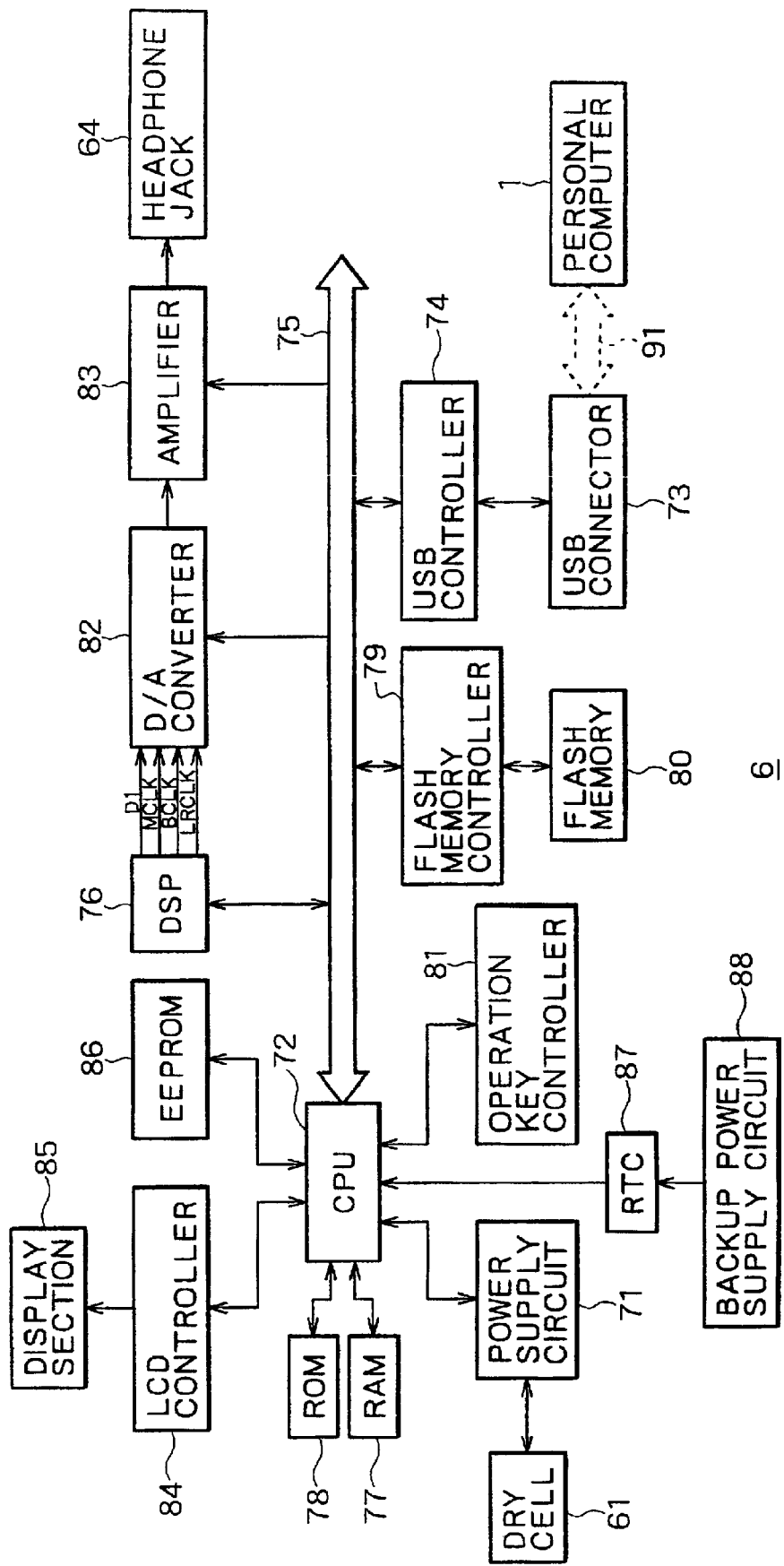
FIG. 5 is a block diagram showing an internal configuration of the portable device of FIG. 3.

The portable device 6 is configured, different from a recording and reproduction apparatus having a mechanical recording and reproduction mechanism such as a hard disk drive, such that, where digital music contents C1 as data supplied from the personal computer 1 are recorded into a semiconductor flash memory 80 provided in the inside of the portable device 6 as shown in FIG. 5, music data D1 of the digital music contents C1 can be reproduced without suffering from temporary interruption of reproduction even if the portable device 6 is in such an environment that vibrations are applied thereto.

Now, an internal configuration of the portable device 6 is described with reference to FIG. 5. The portable device 6 includes a power supply circuit 71 which converts a power supply voltage supplied from the driving dry cell 61 into internal power of a predetermined voltage and supplies the internal power to a central processing unit (CPU) 72 and other circuit blocks to drive the entire portable device 6.

If the portable device 6 is connected to the personal computer 1 through a USB connector 73 by a USB cable 91, then it supplies digital music contents C1 transferred in bulk from the personal computer 1 to the CPU 72 through an internal bus 75 under the control of a USB controller 74.

Figure 6:
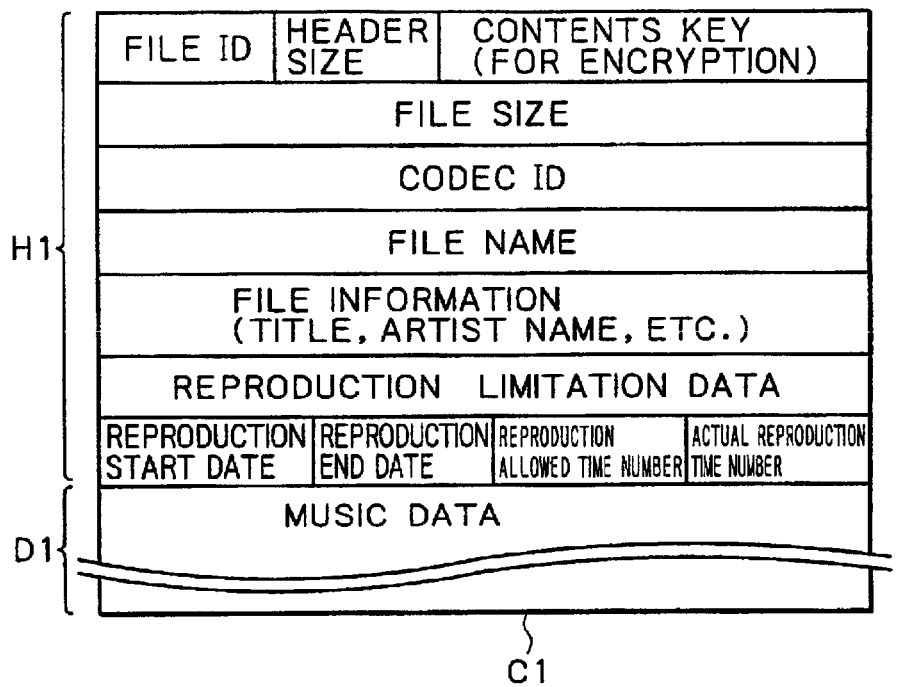
FIG. 6 is a diagrammatic view illustrating a data structure of digital music contents used in the information processing system of FIG. 1.

The digital music contents C1 have a frame configuration wherein one packet is formed from 64 bytes and are transferred at the transfer rate of 12 Mbit/sec from the personal computer 1. One packet of the digital music contents C1 includes a header H1 and music data D1 as seen in FIG. 6. The header H1 has a "file ID", a "header size", a "contents key" for encryption, a "file size", a "code ID", a "file name" and "file information" placed therein. The header H1 further has "reproduction limitation data", a "reproduction start date", a "reproduction end date", a "reproduction allowed time number" and an "actual reproduction time number" placed therein as reproduction control information necessary for a reproduction limitation process.

Figure 7:
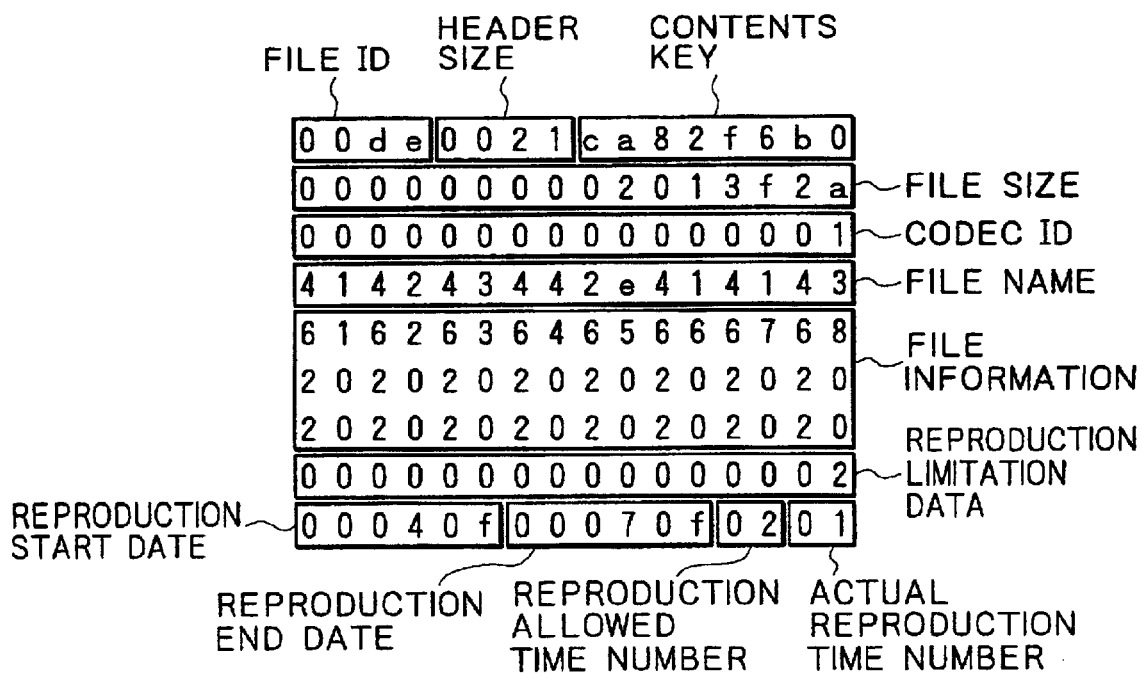
FIGS. 7 and 8 are diagrammatic views illustrating a different data structure of a header of the digital music contents illustrated in FIG. 6.

Actually, each piece of information placed in the header H1 is represented by a hexadecimal digit. As seen in FIG. 7, the "header size" represents the data length of the header H1, and in this instance, it is 33 bytes. The "file size" represents the data length of the file of the music data D1, and in this instance, it is 33 bytes. The "contents key" is cipher key data to be used for decryption of the music data D1 illustrated in FIG. 6, and actually, the digital music contents C1 is transferred in a state further encrypted with a common session key between the personal computer 1 and the portable device 6.

Actually, when the personal computer 1 and the portable device 6 are connected to each other, the portable device 6 must be authenticated by the personal computer 1. In this instance, for example, authentication of the challenge-response system is performed between the personal computer 1 and the portable device 6. Incidentally, in the portable device 6, a digital signal processor (DSP) 76 takes charge of a decryption process when authentication of the challenge-response system is performed.

The authentication of the challenge-response system is authentication of the type wherein, to a challenge which is a predetermined value produced by the personal computer 1, the portable device 6 responds with a response as a value produced using a secret key possessed commonly with the personal computer 1. Since the challenge is changed every time, even if the response is tapped, there is no possibility that it may be re-used. Therefore, mutual authentication can be performed in safe by the authentication procedure of the challenge-response system.

The "codec ID" is an ID number representative of a decompression system to be used for reproduction of the music data D1 of the digital music contents C1 by the portable device 6. A decompression system corresponding to a data compression system called ATRAC (Adaptive TRansform Acoustic Coding) 3 is allocated to the ID number "1", and another decompression system corresponding to another data compression system called MP3 (MPEG Audio Layer-3) is allocated to the ID number "0".

The "file name" is data in the form of an ASCII (American National Standard Code for Information Interchange) code obtained by conversion of, for example, a file name "ABCD.AAC" of the digital music contents C1. The "file information" is data in the form of an ASCII code obtained by conversion of the name of the tune, the name of the artist, the name of the lyric writer, the composer and so forth of the digital music contents C1.

The "reproduction limitation data" is data representative of whether or not reproduction limitation to the reproduction allowed period or the reproduction allowed time number is applied to the digital music contents C1 to be reproduced by the portable device 6. Only when there is some limitation to the reproduction allowed time number, "1" is applied to the "reproduction limitation data", and only when there is some limitation to the reproduction allowed period, "2" is applied to the "reproduction limitation data". But when there is no limitation to reproduction, for example, where the digital music contents C1 have been acquired by purchase, "0" is applied to the "reproduction limitation data".

The "reproduction start date" and the "reproduction end date" are data indicative of the range within which reproduction is allowed when the "reproduction limitation data is "2". For example, where the "reproduction start date" and the "reproduction end date" are "00040F" and "00070F", they indicate that the period from "Apr. 15, 2000" to "Jul. 15, 2000" is the range within which reproduction is allowed.

Similarly, the "reproduction allowed time number" and the "actual reproduction time number" are data indicative of a maximum number of times determined in advance by which reproduction is allowed and an actual updated time number updated by the CPU 72 when a reproduction process is executed, respectively, when the "reproduction limitation data" is "1" or "2". For example, if the "reproduction allowed time number" and the "actual reproduction time number" are "02" and "01", respectively, then they indicate that the "reproduction allowed time number" is "2" times and the "actual reproduction time number" is "1" time.

Figure 8:
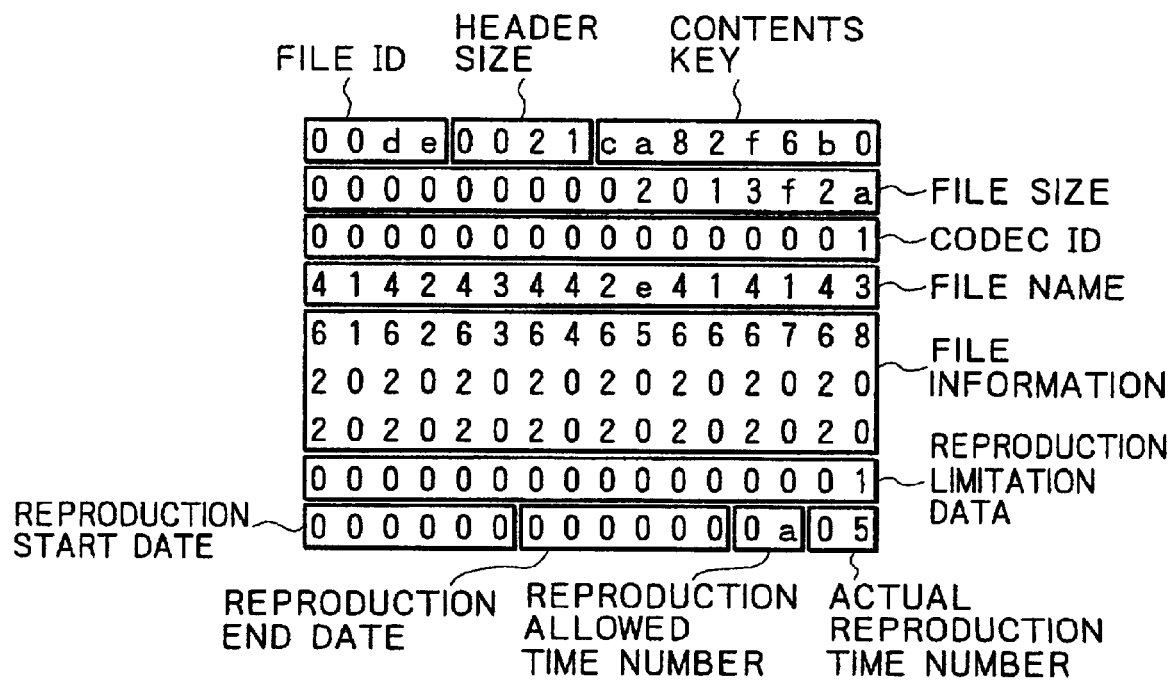

Incidentally, in the header H1 of the digital music contents C1 to which reproduction limitation only with regard to the reproduction allowed time number is applied, for example, as seen in FIG. 8, the "reproduction limitation data" is "1"; the "reproduction start date" and the "reproduction end date" are "000000" and "000000", respectively; and the "reproduction allowed time number" and the "actual reproduction time number" are "0a" and "05", respectively. In particular, it can be seen that there is no limitation to the reproduction allowed period by the "reproduction start date" and the "reproduction end date", but the "reproduction allowed time number" is "10" times, and the "actual reproduction time number" at present is "5".

Referring back to FIG. 5, the portable device 6 receives a writing instruction of the digital music contents C1 transferred thereto from the personal computer 1 together with the digital music contents C1. When the CPU 72 receives the write instruction, it controls a flash memory controller 79 in accordance with a main program read out from a ROM 78 and stored into a RAM 77 to write the digital music contents C1 into the semiconductor flash memory 80.

In the semiconductor flash memory 80, a reproduction code for reproducing the music data D1 in accordance with a decompression system suitable for the music data D1 of the digital music contents C1 compressed in accordance with a predetermined compression system is stored in advance. Accordingly, if a reproduction instruction is inputted to the CPU 72 of the portable device 6 through an operation key controller 81 in response to a depression operation of the reproduction/stop button 59 by the user, then the CPU 72 reads out a reproduction code from the semiconductor flash memory 80 and the music data D1 of the digital music contents C1 and transfers them to a RAM not shown of the DSP 76.

The DSP 76 corrects errors of the music data D1 of the digital music contents C1 in accordance with a Cyclic Redundancy Check (CRC) system based on the reproduction code transferred thereto from the semiconductor flash memory 80, decompresses, reproduces and supplies the error-corrected music data D1 to a digital/analog (D/A) converter 82.

The D/A converter 82 converts the reproduced music data D1 into an analog music signal and transmits the analog music signal to an amplifier 83. The amplifier 83 amplifies the music signal to a predetermined level and outputs the amplified music signal to a headphone not shown from the headphone jack 64 so that the reproduced music is presented to the user through the headphone.

The portable device 6 further includes a liquid crystal display (LCD) controller 84, which is controlled by the CPU 72, to display such information as a reproduction mode state, a sound quality mode for equalization adjustment, a tune number, a reproduction time, a processing state such as reproduction, stopping, fast feeding or fast returning, a sound volume and a battery remaining capacity on the display section 85.

The portable device 6 further includes an electrically erasable programmable read only memory (EEPROM) 86 having a storage capacity smaller than that of the semiconductor flash memory 80. In the EEPROM 86, the number of all digital music contents C1 written in the semiconductor flash memory 80, the block positions of the semiconductor flash memory 80 in which the individual digital music contents C1 are stored and other various kinds of memory information are stored.

A real time clock (RTC) 87 of the portable device 6 is provided to count up the time to perform time management for the digital music contents C1 to which some reproduction limitation is applied. A backup power supply circuit 88 serves as a power supply exclusively for the real time clock 87 and may be a primary cell such as a button cell, a capacitor or the like. The backup power supply circuit 88 allows the counting up of the time to be continued by the real time clock 87 even when the supply of power from the driving dry cell 61 is stopped.

Figure 9A:
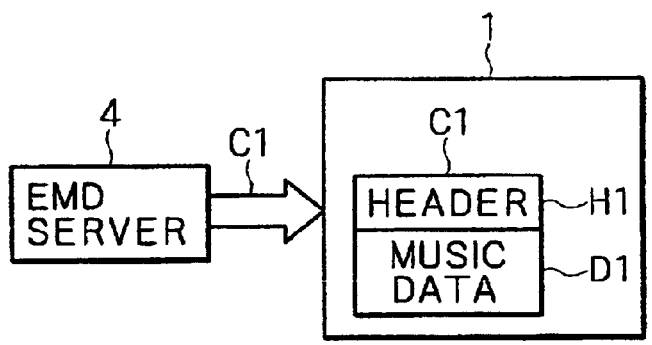
FIGS. 9A to 9C are diagrammatic views illustrating copying of digital music contents.
Figure 9B:
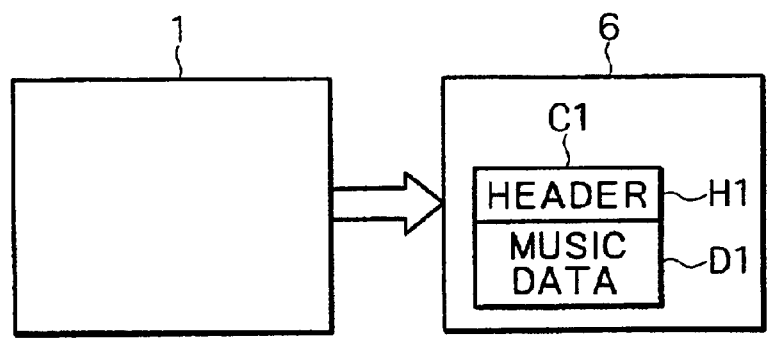

Digital music contents C1 to be stored into the semiconductor flash memory 80 of the portable device 6 are first downloaded from an EMD server 4 into the personal computer 1 through the network 2 as seen in FIG. 9A. Then, the digital music contents C1 downloaded in the personal computer 1 are supplied to and stored into the semiconductor flash memory 80 of the portable device 6 as seen in FIG. 9B.

Figure 9C:
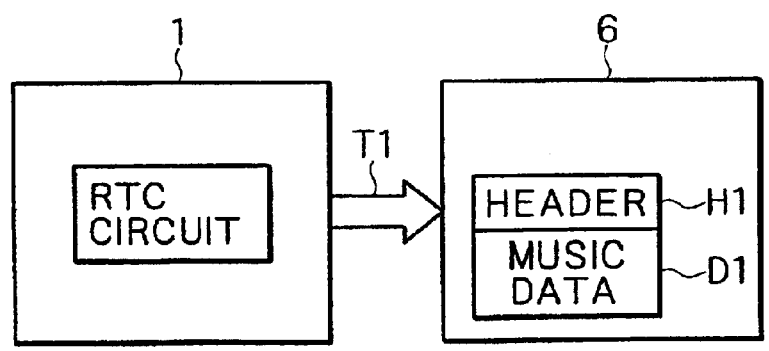

In this instance, also time information T1 including the year, month and day regarding the time is supplied from a real time clock (RTC) circuit not shown built in the personal computer 1 to the portable device 6 as seen in FIG. 9C. The thus supplied time information T1 is written into the EEPROM 86 of the portable device 6. The portable device 6 uses the time information T1 and the clock signal of the real time clock 87 to perform time management of the digital music contents C1 to which some reproduction limitation is applied.

The time management by the portable device 6 is performed by the real time clock 87 counting up the time with reference to the time information T1 supplied thereto from the personal computer 1 to normally produce the latest time information T11'. Then, if the r issues an instruction to reproduce digital music contents C1 stored in the semiconductor flash memory 80 and having some reproduction limitation applied thereto, then it is discriminated whether or not the time information T11' managed by the real time clock 87 is time later than the "reproduction end date" specified in the header H1 of the digital music contents C1, and only if it is discriminated that the time information T11' is not later time, reproduction of the digital music contents C1 is started.

In this manner, also the portable device 6 supervises the term of digital music contents C1 to which some reproduction limitation is applied and can execute such an appropriate process based on the supervision that reproduction of the digital music contents C1 is started or is not permitted.

Since the backup power supply circuit 88 for exclusive use for the real time clock 87 is provided in the portable device 6 as shown in FIG. 5, time management can be executed irrespective of the state of the driving dry cell 61.

However, since the backup power supply circuit 88 requires holding of charge, in order to assure the backup for a predetermined period of time, a certain physical size is required for the backup power supply circuit 88, and it is difficult to miniaturize the backup power supply circuit 88. Further, in order to back up only the real time clock 87, designing of a power supply wiring scheme separate from that for the other circuit elements is required for the real time clock 87. Even if the backup power supply circuit 88 is provided taking such a situation into consideration, the backup cannot be performed without any restriction, but may not possibly be performed because the user is puzzled in exchange of the cell or the portable device 6 is left after the cell is removed. This may result in such a disadvantage that, since the time T11 produced by the real time clock 87 is reset to an initial state, time in the past is produced in error and this disables enjoyment of digital music contents C1 to which a limitation to the utilization term is applied.

Figure 10:
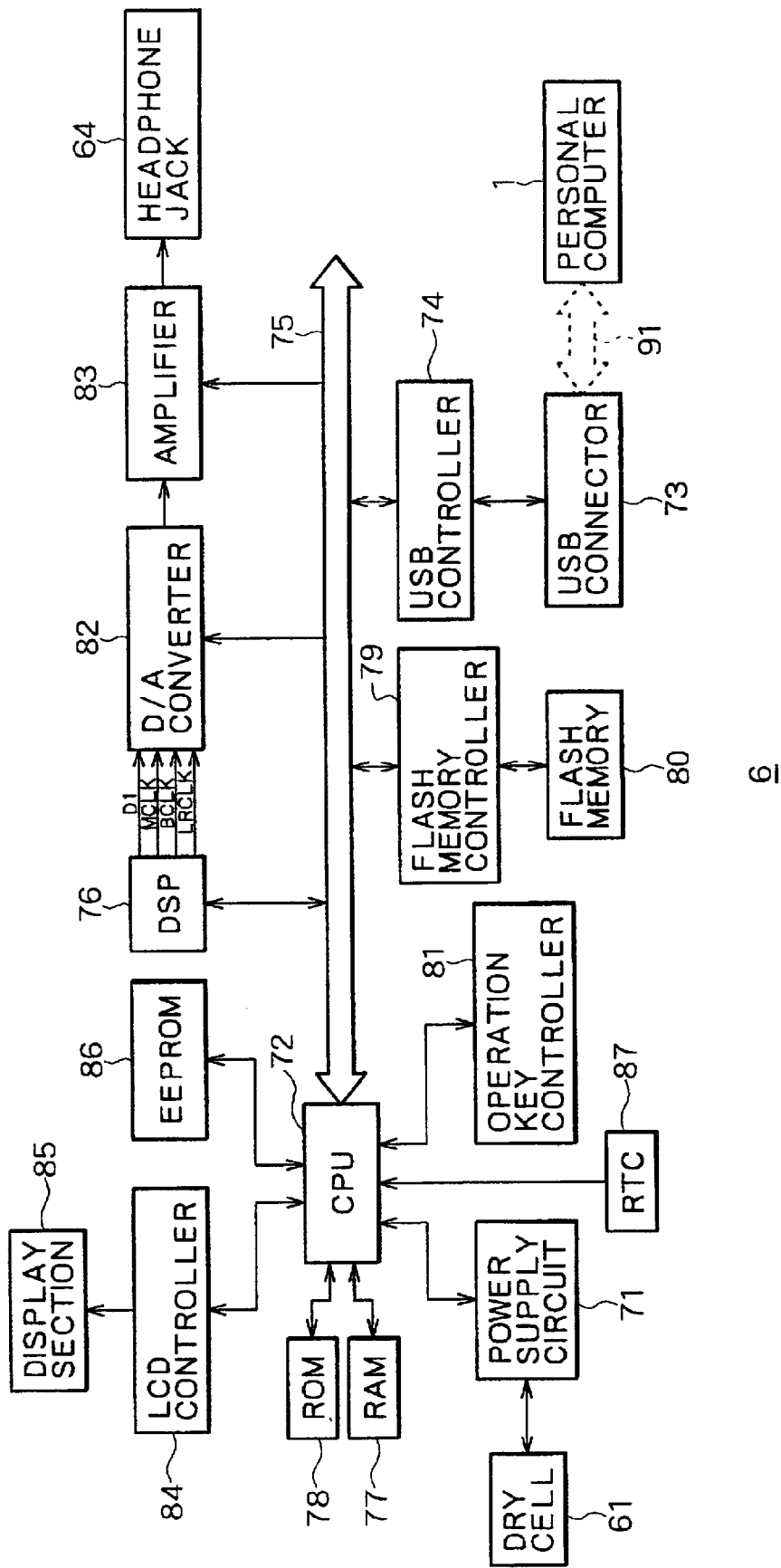
FIG. 10 is a block diagram showing another internal configuration of the portable device of FIG. 3.
Figure 11:
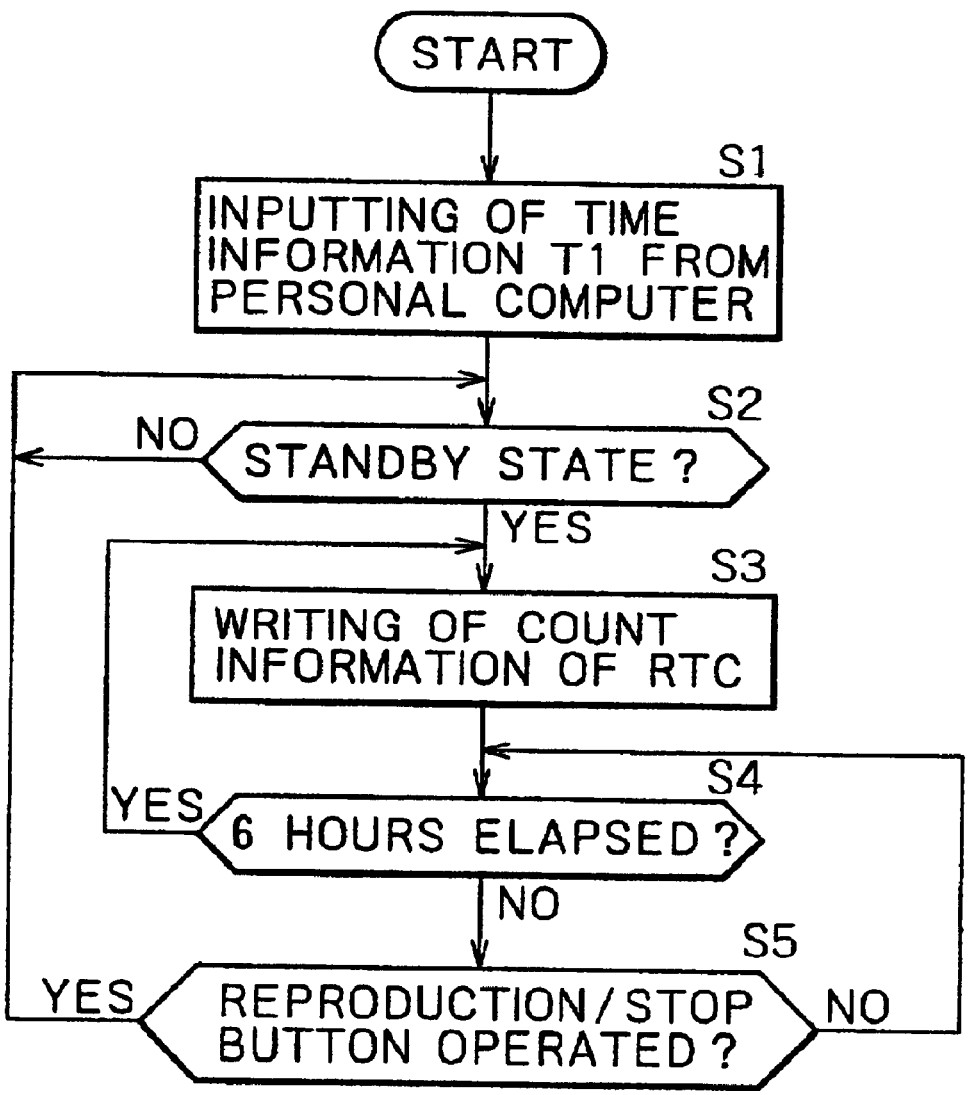
FIG. 11 is a flow chart illustrating time management executed by the portable device of FIG. 10.

Therefore, another portable device 6 shown in FIG. 10 is configured such that the backup power supply circuit 88 is removed from the portable device 6 shown in FIG. 5 but uses a time management method described below with reference to FIG. 11 to prevent the disadvantage described above.

In particular, referring to FIG. 11, when digital music contents C1 are supplied from the real time clock circuit of the personal computer 1 to the portable device 6, also time information T1 is supplied as described hereinabove with reference to FIG. 9 in step S1. The portable device 6 sets the time information T1 supplied thereto to the real time clock 87 and stores the time information T1 into the semiconductor flash memory 80. The real time clock 87 starts counting up with reference to the time information T1 set thereto and continuously performs the counting up operation to successively produce the latest time information T11'. It is to be noted that the updating of the time may otherwise be performed in such a manner that, only when the time information T1 supplied from the real time clock circuit of the personal computer 1 leads the time T11 counted by the real time clock 87, the time information T1 is set to the real time clock 87. This is effective to prevent the real time clock 87 from being set to wrong time when the time information T1 supplied from the personal computer 1 represents time in the past.

In step S2, it is discriminated whether or not the portable device 6 is in a standby mode. Here, the standby mode is described. For the portable device 6, a state called standby mode is prepared in order to prevent the capacity of the driving dry cell 61 from being consumed wastefully.

More particularly, one of operations of the portable device 6 is a reproduction operation, and the reproduction operation is performed by reproducing music data D1 of digital music contents C1 stored in the semiconductor flash memory 80 under the control of the CPU 72 in response to an operation of the reproduction/stop button 59. Then, if the reproduction/stop button 59 is operated during such reproduction, then the reproduction is stopped.

If the reproduction/stop button 59 is operated once again after the reproduction is stopped, then the reproduction of the music data D1 is resumed from the position at which the reproduction has been stopped under the control of the CPU 72. On the other hand, if several seconds or more elapse without an operation of the reproduction/stop button 59 after reproduction is stopped, then the power supply is switched into an off state and the portable device 6 enters the standby mode so that the power consumption thereby is reduced.

Since it is repetitively discriminated in step S2 whether or not the portable device 6 is in such a standby mode as described above, the state of the portable device 6 is normally supervised. Then, if it is discriminated that the portable device 6 is in the standby mode or the mode of the portable device 6 has changed to the standby mode, then the processing advances to step S3. In step S3, the time information T11' of the real time clock 87 is written or overwritten into the semiconductor flash memory 80.

After the process in step S3 is completed, it is discriminated in step S4 whether or not six hours elapse after the point of time of storage of the latest time information T11' into the semiconductor flash memory 80. Here, while the time for discrimination is set to 6 hours, it may otherwise be any hours. For example, an interval timer of the CPU 72 may be set in advance so that the CPU 72 may be placed into an operating state after each 6 hours.

If it is discriminated in step S4 that six hours elapse, that is, if the CPU 72 is placed into an operating state by the interval timer, then the processing returns to step S3, in which writing of the time information T11' of the real time clock 87 is performed. Description of the process here in step S3 is omitted because it is described hereinabove already.

On the other hand, if it is discriminated in step S4 that six hours do not elapse, then the processing advances to step S5, in which it is discriminated whether or not the reproduction/stop button 59 is operated. If it is discriminated that the reproduction/stop button 59 is operated, then the processing returns to step S2 so that the processing in steps beginning with step S2 is repeated. However, if it is discriminated that the reproduction/stop button 59 is not operated, then the processing returns to step S4 so that the processing in steps beginning with step S4 is repeated.

Where the time management is performed in such a manner as described above, at least the time information T11' within six hours is stored in the semiconductor flash memory 80. While the process illustrated in FIG. 11 is described as the time management of the portable device 6 which does not include the backup power supply circuit 88 as shown in FIG. 10, it may be applied also to the time management of the portable device 6 which includes the backup power supply circuit 88 as shown in FIG. 5.

Figure 12:
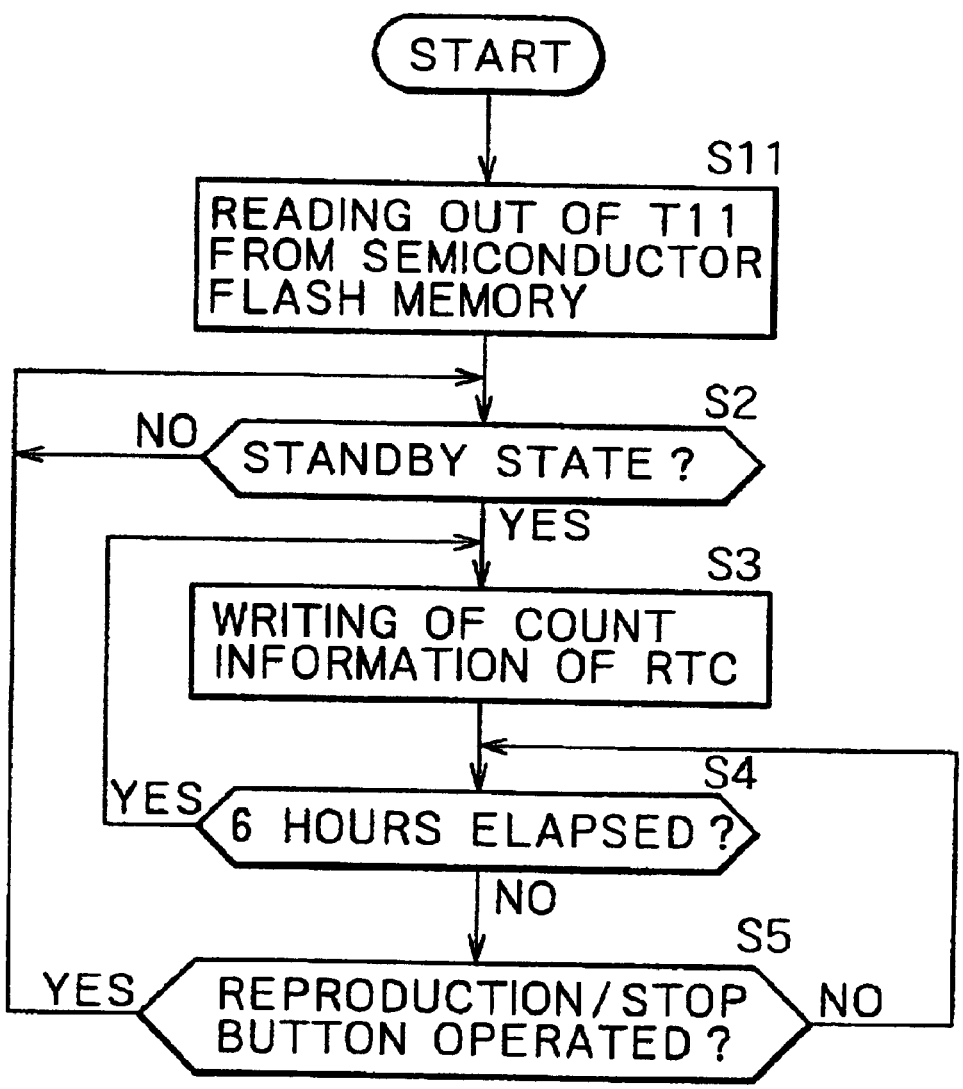
FIG. 12 is a second flow chart illustrating time management executed by the portable device of FIG. 10.

In the portable device 6 shown in FIG. 10, while the driving dry cell 61 is not present as a result of removal, the production of the time T11 by the counting up of the real time clock 87 is temporarily stopped, and the time information T11' of the real time clock 87 may possibly be lost. If power supply from the driving dry cell 61 is started after it is stopped once, then at the point of time, the CPU 72 resumes the process illustrated in FIG. 12. Processes in steps S2, S3, S4 and S5 illustrated in FIG. 12 are similar to those described hereinabove with reference to FIG. 11, and overlapping description of them is omitted herein to avoid redundancy. In first step S11 prior to step S2, the CPU 72 reads out the time information T11' stored in the semiconductor flash memory 80.

Since time information is stored in the semiconductor flash memory 80 and the stored time information is rewritten at a predetermined timing in this manner, even in such a case that supply of power is interrupted, time information can always be acquired by using the stored time information. By using the time information to perform term management of digital music contents C1 to which some limitation with regard to the term is applied, illegal utilization of the digital music contents C1 can be prevented.

Further, where the portable device 6 is configured such that it does not use a backup power supply, the circuit scale of the portable device 6 can be reduced. Further, since the time information is performed in the inside of the portable device 6, such illegal accessing of the user as to change the time information from the outside can be prevented.

It is to be noted that, while, in the embodiment described above, time information is stored into the semiconductor flash memory 80, it may otherwise be stored into the EEPROM 86. Further, while the embodiment described above handles digital music contents C1, the present invention can be applied also to where other data such as, for example, video data is handled.

Further, in the embodiment described above, it is discriminated whether or not six hours elapse after the standby mode is entered and, if it is discriminated that six hours elapse, then the time information stored in the semiconductor flash memory 80 is updated. However, alternatively the point of time at which the driving dry cell 61 is re-loaded and the power whose supply has stopped once begins to be supplied again may be used as reference time, and the time information may be updated after each six hours elapse from the reference time irrespective of whether or not the standby mode is entered. In this instance, when the standby mode is entered, the reference time of the period of six hours may be updated at the point of time at which the standby mode is entered.

Furthermore, in the embodiment described above, when digital music contents are downloaded from the personal computer 1, also the time information T1 is supplied. However, not only upon such downloading, but also when the portable device 6 and the personal computer 1 are connected to each other such as, for example, upon check-in or check-out, the time information T1 may be supplied from the personal computer 1 to the portable device 6 so that the time information stored in the semiconductor flash memory 80 and the real time clock 87 of the portable device 6 may be updated.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium is formed as a package medium such as, as shown in FIG. 2, a magnetic disk 41 a CD-ROM (Compact Disk-Read Only Memory) and a DVD (Digital Versatile Disk)), a magneto-optical disk 43 (including an MD (Mini-Disk)), or a semiconductor memory 44, which is distributed to provide the program to a user separately from a computer, or as a ROM 12 or a HDD 21 on which the program is stored and which is provided in a state wherein it is installed in a computer in advance.

It is to be noted that, in the present specification, the steps which describe a program provided in the form of a medium may be but need not necessarily be processed in a time series in the order as described, and include processes which are executed parallelly or individually without being processed in a time series.

Further, the term "system" in the present specification is used to signify an entire apparatus composed of a plurality of apparatus.

Further, the flash memory into which contents data and reproduction limitation data are recorded need not necessarily be provided in a reproduction apparatus, but may be stored in a recording medium which can be loaded into the reproduction apparatus such that reproduction of data may be performed by a loading mechanism for a recording medium and an interface not shown provided in the reproduction apparatus. In this instance, if the time information T1 produced by the real time clock of the personal computer 1 is recorded into the recording medium loaded in the reproduction apparatus when contents data are recorded by the personal computer 1 or when the recording medium is loaded in the personal computer 1 and the time T11 of the real time clock 87 is corrected when the time in the recording medium indicates time prior to that of the real time clock 87 in the reproduction apparatus, then even when the reproduction apparatus is not connected to the personal computer 1, the time to be produced by the real time clock 87 in the reproduction apparatus can be advanced to produce time proximate to the actual time with certainty.

As apparent from the foregoing description, since elapsed time with reference to the time indicated by first information stored is measured to produce second information regarding the time and the first information is updated to the produced second information at a predetermined timing, illegal use of contents can be prevented by managing a term of use of the contents using the first information and the second information.

While a preferred embodiment of the present invention has been described using specific terms, such description is for illustrative purposes only, and it is to be understood that changes and variations may be made without departing from the spirit or scope of the following claims.

What is claimed is:

1. A reproduction apparatus with a battery for reproducing term-managed main data, comprising:
    main data storage means for storing said term-managed main data;
    term data storage means for storing term management data for managing said term-managed main data;
    time counting means operating with said battery for counting time and producing time information;
    holding means for holding said time information counted by said time counting means when power is not supplied to said time counting means from said battery; and
    control means for controlling said holding means to hold said time information counted by said time counting means at a predetermined time,
    wherein said control means controls said holding means to hold said time information at a predetermined timing, and
    wherein said control means controls said holding means to hold said time information when said reproduction apparatus enters a low power consumption mode.

2. The reproduction apparatus according to claim 1, wherein, when a supply of power from said battery of said reproduction apparatus is resumed after said supply of power from said battery is interrupted, said control means controls said time counting means to resume said counting time base on said time information held by said holding means.

3. The reproduction apparatus according to claim 1, wherein said control means permits reproduction of said term-managed main data based on said term management data stored in said term data storage means.

4. The reproduction apparatus according to claim 3, wherein said control means permits reproduction of said main data based on said term management data stored in said term data storage means and said time information counted by said time counting means.

5. The reproduction apparatus according to claim 1, wherein said time information is held by said holding means after each predetermined interval of time.

6. The reproduction apparatus according to claim 1, further comprising:
    operation means for being operated by a user, and
    wherein said reproduction apparatus enters said low power consumption mode in which said power supply to a predetermined circuit block is topped when said operation means is not operated by said user for a predetermined period of time.

7. The reproduction apparatus according to claim 6, wherein said time counting means continues said counting time using said power from said battery even when said reproduction apparatus is in said low power consumption mode, and said control means controls said holding means to hold said time information counted successively by said time counting means after each predetermined period of time while said reproduction apparatus is in said low power consumption mode.

8. The reproduction apparatus according to claim 1, further comprising:
    connection means for allowing communication with another apparatus, and
    wherein said control means adjusts, when said reproduction apparatus is connected to said another apparatus by said connection means, said counting time of said time counting means based on time information sent from said another apparatus to said reproduction apparatus.

9. A reproduction apparatus with a battery for reproducing term-managed main data, comprising:
    main data storage means for storing said term-managed main data;
    term data storage means for storing term management data for managing said term-managed main data;
    time counting means operating with said battery for counting time and producing time information;
    holding means for holding said time information counted by said time counting means when power is not supplied to said time counting means from said battery; and
    control means for controlling said holding means to hold said time information counted by said time counting means at a predetermined time; and
    connection means for allowing communication with another apparatus,
    wherein said control means adjusts, when said reproduction apparatus is connected to said another apparatus by said connection means, said counting time of said time counting means based on time information sent from said another apparatus to said reproduction apparatus, and
    wherein said adjustment of said counting time of said time counting mean is performed when said time information of said another apparatus connected to said reproduction apparatus leads said time information counted by said time counting means.

10. A reproduction method for a reproduction apparatus that reproduces term managed main data using a battery as a power supply, comprising the steps of:
    reading, from a timer that operates with said power supply from said battery to count time and stops time counting when said power is not supplied from said battery, time information to be used for term management of said term-managed main data and writing said time information into a nonvolatile memory that holds data even when said power is not supplied thereto from said battery; and
    setting said time information written in said nonvolatile memory to said timer when said power is supplied again after said power supply from said battery is interrupted,
    wherein said writing of said time information into said nonvolatile memory is performed when said reproduction apparatus enters a low power consumption mode.

11. The reproduction method according to claim 10, further comprising the step of:
    discriminating, when an instruction to reproduce said term managed main data is received, whether to permit reproduction of said term-managed main data based on term-management data and said time counted by said timer.

12. The reproduction method according to claim 10, wherein said writing of said time information into said nonvolatile memory is performed after each predetermined interval of time.

13. The reproduction method according to claim 10, further comprising the steps of:

receiving a time information sent from another apparatus connected to said reproduction apparatus; and re-setting said timer based on said received time information sent from said another apparatus.

14. A reproduction method for a reproduction apparatus that reproduces term managed main data using a battery as a power supply, comprising the steps of:

reading, from a timer that operates with said power supply from said battery to count time and stops time counting when said power is not supplied from said battery, time information to be used for term management of said term-managed main data and writing said time information into a nonvolatile memory that holds data even when said power is not supplied thereto from said battery;

setting said time information written in said nonvolatile memory to said timer when said power is supplied again after said power supply from said battery is interrupted;

receiving a time information sent from another apparatus connected to said reproduction apparatus; and re-setting said timer based on said received time information sent from said another apparatus, wherein said step of re-setting said timer is performed when said receive time information sent from said another apparatus leads said time produced by said timer.

* * * * *